Aug. 1, 1939.  A. C. CATLAND  2,168,060
METHOD OF MAKING CUTTERS FOR WELL DRILLING TOOLS
Original Filed June 15, 1937
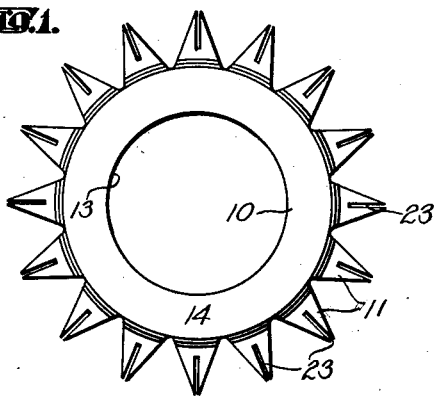
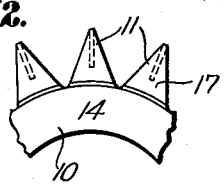
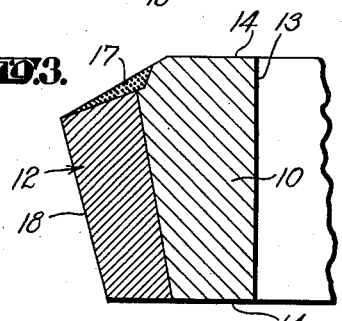
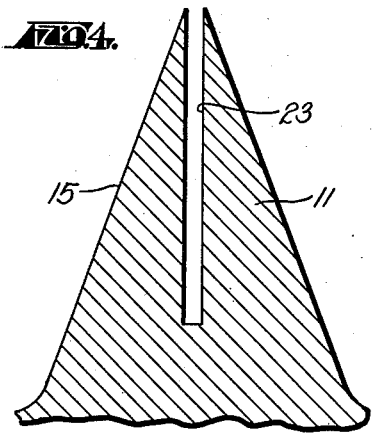
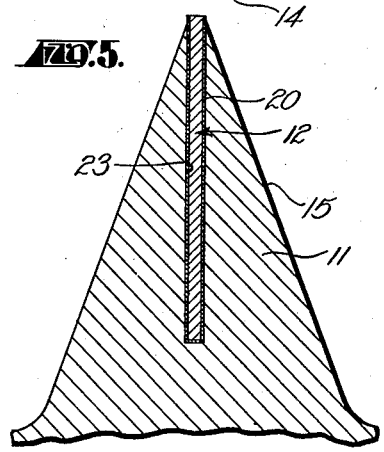
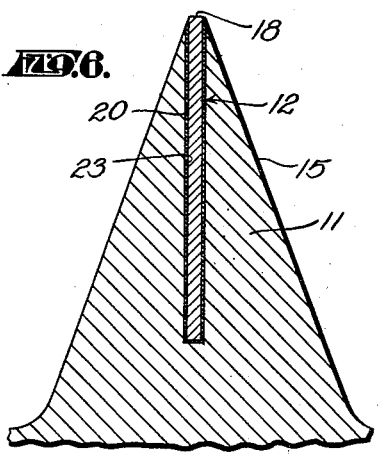
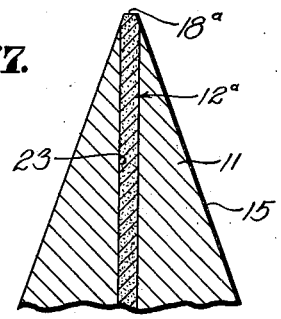
Inventor
ALFRED C. CATLAND
By
His Attorney Patented Aug. 1, 1939

2,168,060

UNITED STATES PATENT OFFICE 2,168,060

METHOD OF MAKING CUTTERS FOR WELL DRILLING TOOLS

Alfred C. Catland, Alhambra, Calif., assignor to Globe Oil Tools Company, Los Nietos, Calif., a corporation of California Original application June 15, 1937, Serial No. 148,298. Divided and this application February 5, 1938, Serial No. 188,893

2 Claims. (Cl. 76—108)

This invention relates to a method for making cutting elements and relates more particularly to a method for making cutters for well drilling tools. A general object of this invention is to provide a simple, commercially practical method for making effective well tool cutters.

This application is a division of my application for Letters Patent of the United States, Serial No. 148,298, filed June 15, 1937, entitled "Cutter for well drilling tool".

The cutters of rotary well drilling tools are subjected to severe wear and it has been the general practice where possible to face the active parts of the cutters with hard, abrasion resisting materials. The cutting parts of well tools operating by scraping or abrasive action usually have quite large surfaces making it possible to face them with welded on or brazed on abrasion resisting materials. However, cutting elements that operate by a percussive action such as the roller cutters of a rock bit usually have small cutting parts or teeth and it is very difficult to weld, braze or cast hard cutting material on their faces without making their cutting edges blunt and ineffective.

An object of this invention is to provide an effective method for incorporating abrasion resisting material in the teeth of a roller cutter of the type that operates by a percussive action.

Another object of this invention is to provide a practical method for providing abrasion resisting elements on the teeth of a roller cutter without thickening the teeth and without rendering the active edges of the teeth blunt.

Another object of this invention is to provide a method for incorporating extensive bodies of hard wear resisting material in the central zones of the teeth of a preformed cutter.

Another object of this invention is to provide a method of the character mentioned in which the hard abrasion resisting elements are accurately located and dependably bonded with the material of the teeth.

A further object of this invention is to provide a method of the character mentioned for making a roller cutter whose teeth are self-sharpening through use.

The various objects and features of my invention will be fully understood from the following detailed description of typical preferred manners of carrying out the method of my invention, throughout which description reference is made to the accompanying drawing, in which:

Fig. 1 is an end elevation of a pre-formed cutter illustrating the slots in the cutter teeth for the reception of the hard cutting elements. Fig. 2 is a fragmentary end elevation of the cutter illustrating the ends of the teeth following the brazing and welding operations. Fig. 3 is a fragmentary longitudinal sectional view of the finished cutter. Fig. 4 is an enlarged transverse detailed sectional view of one of the teeth of the cutter before the insertion of the wear resisting element. Fig. 5 is a view similar to Fig. 4 showing one form of insert or abrasion resisting element in position in the slot. Fig. 6 is a view similar to Fig. 5 illustrating the abrasion resisting element brazed to the tooth and Fig. 7 is a fragmentary view similar to Fig. 5 illustrating another form of abrasion resisting element in position in the slot following the brazing operation.

The method of the present invention may be employed in connection with the manufacture of well tool cutting elements and similar devices of different characters, shapes, etc. The invention is particularly adapted for use in conjunction with the manufacture of percussive cutting elements and in the following detailed description I will describe the method as employed in the manufacture of a roller cutter for a well drilling bit or the like. It is to be understood that the invention is not to be construed as limited or restricted to the specific application of the invention about to be described.

The roller cutter illustrated in the drawing is intended to be rotatably supported on a well drilling tool so that its cutting parts or teeth have rolling engagement with the earth formation and, therefore, a percussive cutting action on the formation. The cutter includes a body 10 provided at its periphery with a multiplicity of cutting teeth 11. The body 10 has a central longitudinal opening 13 to facilitate its rotatable mounting on a tool. The opposite ends 14 of the cutter body 10 are flat and parallel and the cutter is frusto-conical, that is, the periphery of the body 10 slopes or inclines relative to the longitudinal axis of the body. The cutting teeth 11 are arranged longitudinally on the periphery of the cutter 10 and are equally transversely spaced. The ends of the teeth 11 at the large end of the body 10 are bevelled off and the adjacent portions of the body may be bevelled in a similar manner. In accordance with the invention, the teeth 11 are substantially V-shaped in transverse cross section having outwardly convergent sides 15. The roller cutter just described may be cast or formed in any other practical manner.

The improved method of the present invention comprises, generally, the provision of slots 23 in the cutter teeth 11, the arrangement of elements 12 or 12a of abrasion resisting material in the slots 23 and the brazing of the elements 12 or 12a to the teeth 11.

The slots 23 may be formed in the teeth 11 in any suitable manner. For example, they may be cut or milled in the teeth following the casting or forming of the cutter. The slots 23 extend longitudinally of the teeth 11 and there is preferably a single slot in each tooth. The slots 23 extend between the opposite ends of their respective teeth 11 and occupy the medial longitudinal planes of the teeth. As illustrated in the drawing the slots 23 enter the teeth 11 from their outer edges or crests and are substantially radial relative to the longitudinal axis of the cutter body 10. The several slots 23 may be of the same size and shape and may have substantially parallel side walls.

The abrasion resisting elements 12 or 12a are intended to be incorporated in the teeth 11 to make the teeth particularly effective, long wearing, and self-sharpening through use. The elements 12 or 12a are shaped and proportioned to occupy the slots 23 so that their outer edges 18 or 18a occur at the crests of the teeth. The invention contemplates the employment of either form of abrasion resisting element 12 or 12a.

The hard abrasion resisting elements 12 are in the form of sheets or plates of pre-sintered or pre-cast abrasion resisting material such as tungsten carbide, or the like. Prior to the insertion of the elements 12 in the slots 23 each element is wrapped with a foil 20 of copper, aluminum or similar material for brazing the elements to the walls of the slots. The elements 12a are proportioned so that they rather accurately fit the slots 23 when provided with the foil 20. The foil 20 is adapted to cooperate with the bottom walls as well as the side walls of the slots 23.

The hard abrasion resisting elements 12a are formed of granular or powdered tungsten carbide or other hard abrasion resisting material mixed with powdered copper or other metal having a lower melting point than steel. The granular or powdered abrasion resisting material and the powdered copper are pressed into the self-sustaining sheets or plates which constitute the elements 12a. The unsintered elements 12a are shaped and proportioned to fit the slots 23 so that their surfaces cooperate with the bottom and side walls of the slots and so that their outer edges 18a occur at or are exposed at the crests of the teeth 11.

Following the insertion of an abrasion resisting element 12 or 12a in a slot 23 of a tooth 11 the said tooth is heated in a suitable atmosphere and brought to the melting point of the aluminum or copper foil 20 of the element 12 or to the melting point of the powdered copper of the element 12a. When the tooth slot 23 contains an element 12 the heating of the tooth melts the foil 20 so that the foil dependably bonds or brazes the element 12 to the metal of the tooth 11 or to the walls of the slot 23. Fig. 6 of the drawing illustrates an abrasion resisting insert or element 12 finally brazed in the slot 23 of a tooth 11. If an element 12a is inserted in a slot 23 the heating of the tooth 11, as described above, melts the powdered copper of the unsintered element 12a so that the element is simultaneously sintered into a substantially homogeneous mass and bonded or brazed to the metal of the tooth 11 defining the walls of the slot 23.

The heating of a tooth 11 as just described thus completes the bonding or brazing of the element 12 or 12a as the case may be, in the slot 23 to constitute a rigid part of the tooth. It will be readily understood how the abrasion resisting elements 12 or 12a may be brazed in the slots 23 of the several teeth 11 to provide the teeth with hard cutting inserts. Following the brazing or bonding of the elements 12 or 12a in the teeth 11 the outer edges 18 or 18a of the elements may be sharpened to constitute the cutting edges of the teeth.

Following the brazing of the inserts or elements 12 or 12a in the slots 23 the bevelled ends of the teeth 11 at the large end of the frusto-conical cutter body 10 may be faced with tungsten carbide or other abrasion resisting material 17. The material 17 may be welded to the teeth 11 and to adjacent parts of the cutter body 10 and may be bevelled off in conformity to the bevelled ends of the teeth 11.

It is believed that the method of the present invention will be readily understood from the foregoing detailed description. The hard abrasion resisting inserts or elements 12 or 12a are easily and quickly bonded or brazed to the teeth 11. The elements 12 or 12a occupy the central longitudinal planes of the teeth 11 so that they are supported and backed up by the material of the teeth and are not subject to fracture or failure. The method of the invention is rapid and may be carried out with simple, typical equipment. The incorporation of the elements 12 or 12a in the teeth 11 makes the teeth long wearing and self-sharpening through use. After the cutter has been in service for some time the teeth 11 may gradually wear away. The teeth 11 wear away at their sides 15 and as they wear the outer active edges 18 or 18a of the elements 12 or 12a are exposed. This continuous or progressive exposure of the hard abrasion resisting plates or elements 12 or 12a at the crests of the teeth 11 throughout the life of the teeth makes the teeth self-sharpening. The elements 12 or 12a being exposed to the crests of the teeth 11 insure the even wearing of the teeth so that the teeth may retain their original general configuration when worn. The elements 12 or 12a are of substantial depth or width giving the teeth 11 a long life. The hard abrasion resisting elements 12 or 12a may be of like size and shape so that the several teeth 11 of the cutter wear evenly or uniformly to assure a uniform cutting action throughout the circumference of the cutter.

Having described only typical preferred manners of carrying out the method of my invention, I do not wish to be limited or restricted to the specific details herein set forth, but wish to reserve to myself any variations or modifications that may appear to those skilled in the art or fall within the scope of the following claims.

Having described my invention, I claim:

1. The method of incorporating abrasion resisting material in the body of a tooth comprising providing a slot in the tooth, providing a pressed sheet of powdered abrasion resisting material and copper, placing said sheet in the slot, and then heating the tooth to sinter the sheet and fuse it to the walls of the slot.

2. The method of making a roller cutter comprising forming a cutter body having cutting teeth, providing substantially medial longitudinal slots in the teeth, providing unsintered plate-like elements of granular abrasion resisting material and brazing material, arranging said elements in the slots to have edges at the crests of the teeth, and then heating the teeth to sinter said elements and braze them to the teeth.

ALFRED C. CATLAND.